United States Patent [19]

Dyer et al.

[11] Patent Number: 5,330,838

[45] Date of Patent: Jul. 19, 1994

[54] COATED CARBONACEOUS ARTICLES AND METHOD FOR MAKING SAME

[75] Inventors: Paul N. Dyer, Allentown; Vincent L. Magnotta, Wescosville; Robert E. Stevens, Emmaus, all of Pa.

[73] Assignee: Air Products and Chemicals, Inc., Allentown, Pa.

[21] Appl. No.: 228,346

[22] Filed: Jul. 29, 1988

[51] Int. Cl.$^5$ .................................. B05D 7/00
[52] U.S. Cl. .................................. 428/408; 428/145; 428/241; 428/288; 428/317.9; 428/446; 427/307; 427/419.7
[58] Field of Search ............. 427/307, 419.7; 428/145, 241, 317.9, 408, 228

[56] References Cited

U.S. PATENT DOCUMENTS

| | | | |
|---|---|---|---|
| 4,397,901 | 8/1983 | Warren | 428/408 X |
| 4,515,860 | 5/1985 | Holzl | 428/408 |
| 4,795,677 | 1/1989 | Gray | 428/246 |

OTHER PUBLICATIONS

U.S. patent appln. Ser. No. 873,004, Jun. 11, 1986.
U.S. patent appln. Ser. No. 131,479, Oct. 7, 1987.

*Primary Examiner*—Peter A. Nelson
*Attorney, Agent, or Firm*—Keith D. Gourley; James C. Simmons; William F. Marsh

[57] ABSTRACT

A method for producing a protective coating on the surface of a carbonaceous substrate is described. A substantially uniform coating of a liquid or solid precursor material is provided on the surface of the substrate. The precursor material is one which has boron-oxygen bonds and is substantially non-reactive with the substrate at a first relatively low temperature and is capable of reacting with the substrate at a second temperature which is substantially higher than the first temperature. The substrate is then raised to the second temperature to react the coating with the substrate to form a porous region of substantially uniform depth in the substrate surface. This region contains interconnecting interstices and boron carbide. The interconnecting interstices are then at least partially filled with a glass forming material such as boron, boron oxide, boron carbide, silicon, silicon alloy, silicon dioxide, silicon nitride, silicon oxynitride, germania, and mixtures thereof. A refractory coating may then be deposited on the filled layer. Also described is a coated article produced in accordance with the described method.

21 Claims, No Drawings

COATED CARBONACEOUS ARTICLES AND METHOD FOR MAKING SAME

TECHNICAL FIELD

This invention relates generally to carbon bodies having improved resistance to oxidation. More particularly, the invention relates to an improved method for the manufacture of carbon bodies having oxidation resistance at both high and intermediate temperatures, and to oxidation resistant carbon bodies produced thereby.

BACKGROUND ART

The desirability of providing carbon bodies having oxidation resistance is well-known. Carbonaceous materials such as monolithic carbon, graphite, and carbon-carbon composites of fibers in carbon have excellent strength-to-weight properties at high temperatures, e.g., 1400° C. and higher, and are generally superior to conventional construction materials such as metals and super alloys at these temperatures. In addition, the mechanical strength of a carbon body increases as the temperature increases, whereas in conventional structural metals, the strength typically decreases with increased temperature.

The use of carbon bodies in high temperature applications has been limited due to the relatively high reactivity of carbon, principally with oxygen, at temperatures above about 400°-500° C. Such reactivity results in erosion of the carbon body due to the reaction between carbon and oxygen, yielding carbon monoxide and carbon dioxide. Accordingly, many attempts have been made to provide oxidation-resistant coatings for carbon bodies in order to permit their use in oxidizing environments and at elevated temperatures.

Major difficulties have been encountered in attempting to provide oxidation-resistant coatings on carbon bodies. One difficulty is that the coefficient of expansion of the carbon body may be very different from that of the oxidation-resistant coating. The stresses that result from different coefficients of expansion between the coating and the underlying carbon body cause cracking or rupture of the coating, particularly when the part is subjected to thermal cycling. When the coating integrity is thus compromised, oxygen penetrates the coating and attacks the underlying carbon body with resulting loss of structural integrity.

Surface porosity in the carbon body, which results from articles which are not fully densified, may cause pinholes to form in the coating during the coating process. This also may allow oxygen to penetrate to the carbon body. It has also been found that mechanical vibration, debris impingement, and the like may cause cracking of brittle protective coatings.

Successful resistance to high temperature oxidation may be achieved by the process disclosed in U.S. Pat. No. 4,515,860, which is incorporated herein by reference. The oxidation-resistant carbon body disclosed in this patent has thermochemically deposited thereon a silicon alloy coating containing one or more alloying elements selected from the group consisting of carbon, oxygen, aluminum, and nitrogen. The amount of silicon in the coating is in excess of the stoichiometric amount and the alloy coating has a non-columnar grain distribution having substantially equiaxial grains of an average diameter of less than one micron. Because of the exceptionally fine grain size and even grain distribution in the coating, any cracks that may occur are extremely fine in width and form a mosaic pattern. The amount of silicon in excess of the stoichiometric amount fills in these fine cracks when the carbon body is heated to above the melting point of silicon, e.g., above 1410° C., and reacts with any oxygen to form a glassy silicon oxide which acts as a filler sealing the cracks. This patent also contemplates, on an optional basis, particularly where lower temperature crack-resistance is desired, providing an intermediate boron layer. Boron reacts with oxygen to form a glassy boron oxide sealant and flows into any cracks that have formed. In commercial practice the carbon body is usually provided with a preliminary treatment in a mixture of chromic acid and sulfuric acid.

The oxidation resistance conferred by the coatings described in U.S. Pat. No. 4,515,860 provides significant superior characteristics as compared to the coatings of the prior art. Under some circumstances, however, particularly where severe temperature cycling occurs, the protection system may be inadequate to properly seal the cracking which occurs in the brittle coating such that the carbon body is subjected to oxidative attack.

In U.S. patent application Ser. No. 873,004, a coated carbon body is described having improved resistance to oxidation over wide temperature ranges including low temperatures of 500°-1000° C. and high temperatures in excess of 1400° C. The carbon bodies produce by the methods described therein also exhibit excellent oxidation resistance even in environments that involve high temperature thermal cycling. In addition, such carbon bodies exhibit excellent resistance to ablation and erosion.

In the aforesaid patent application, a carbon body is heated to an elevated temperature, generally above 1500° C., and is exposed to preferably gaseous boron oxide. The resulting gas-solid reaction causes the surface of the carbon body to become etched and results in the formation of boron carbide which is contained in the converted and etched surface. The etched and converted surface zone is about 2 to 250 microns deep and is characterized by interconnecting interstices. Following formation of the etched surface, the converted carbon body is provided with a glass forming coating, at least a portion of which is within the interconnecting interstices. The glass forming material may be selected from the group consisting of boron, boron oxide, boron carbide, silicon, silicon alloy, silicon dioxide, germania, and mixtures thereof.

In U.S. patent application Ser. No. 131,479, a continuation-in-part application to Ser. No. 873,004 referred to above, silicon nitride and silicon oxynitride are disclosed as additional glass forming materials.

It has been found that, under certain circumstances, the use of a gaseous boron oxide reactant in the foregoing described method may be difficult. For example, on carbonaceous substrates having complex geometric shapes of, it may be difficult to control the uniformity of the surface etching and conversion. This difficulty is attributable to the formation of concentration gradients of boron oxide present in the gas phase treating the carbon material. In addition, velocity gradients in the fluid flow patterns surrounding the substrate may also contribute to non-uniformity. Moreover, more than one high temperature treatment may be required to form the desired conversion layer in the substrate since certain areas which are poorly exposed to the reactant gas may remain unetched or poorly etched. The foregoing difficulties also make it difficult to scale up the process to accommodate large components, since flow conditions and concentration gradients may be affected as a result of the scale up.

DISCLOSURE OF INVENTION

The present invention provides a carbon body with a coating having improved resistance to oxidation, ablation and erosion in temperature ranges from 500° C. to as high 1400° C., Wherein the coating is of substantially uniform depth and is easily produced and readily reproducible.

Very generally, in accordance with the method of the present invention, a carbonaceous substrate is provided with a substantially uniform coating of a liquid or solid precursor material on the substrate surface. The precursor material is one which has boron-oxygen bonds and which is substantially non-reactive with the substrate at a relatively low first temperature of about 0° C. to about 100° C., preferably room temperature. The precursor material is capable of reacting with the substrate at a second temperature which is substantially higher than the first temperature, i.e. in the range of about 1200° C. to about 3000° C. The substrate temperature is then raised to the second temperature to react the coating with the substrate to form a porous region of substantially uniform depth in the substrate surface containing interconnecting interstices and boron carbide. The substrate is then coated with a glass forming material which at least partially fills the interconnecting interstices. The glass forming material may be selected from the group consisting of boron, boron oxide, boron carbide, silicon, silicon alloy, silicon dioxide, silicon nitride, silicon oxynitride, germania, and mixtures thereof which may be deposited on the etched surface of the carbon body by any convenient means such as chemical vapor deposition or other techniques such as sol-gel impregnation.

The glass forming material may also contain borides and oxides of zirconium, aluminum, magnesium, hafnium, or titanium, carbides of zirconium, hafnium, or titanium, nitrides of zirconium, hafnium, or titanium and mixtures thereof.

DETAILED DESCRIPTION OF THE INVENTION

In a preferred embodiment, the carbon body is provided with an outer refractory coating which may contain silicon in excess of stoichiometry. The refractory outer coating comprises compounds selected from the group consisting of carbides, borides or nitrides of silicon, zirconium, tantalum, hafnium, niobium and titanium, and silicon oxynitride, and aluminum boride or nitride or mixtures thereof.

In the preferred embodiment of the present invention, the coated carbon body has an outer refractory coating and an intermediate glass forming coating which reacts with oxygen and other constituents that may be present to form a glass-like material. The carbon body also has an additional protective layer essentially within the original dimensions of the uncoated carbon body which has been converted at least in part to boron carbide ($B_4C$). $B_4C$ in use reacts with any oxygen that succeeds in penetrating the intermediate coating, forming $B_2O_3$ which is also glass-like in nature.

It has been discovered that the etching of the surface of the carbon body as described below provides a highly desirable surface upon which to deposit the selected intermediate coating and also provides a further measure of protection against oxidative attack on the carbon body. The oxygen present in the precursor coating material reacts at the processing conditions with the carbon body to form gaseous carbon monoxide or carbon dioxide. This results in the formation of interconnected interstices or pores extending into and beneath the surface of the carbon body. The boron in the precursor coating material reacts with the carbon to form boron carbide in accordance with the formula $2B_2O_3 + 7C \rightarrow B_4C$, $6CO$. The surface of the carbon body is not eroded uniformly with the result that interconnected pore-like interstices are formed. The precursor material reacts with the carbon body to a depth that is determined by the length of contact time. The interstices contribute to the total void volume which occupies up to about 50 percent of the volume of the converted layer. The surface of the carbon body, including the internal surfaces of the interstices, contains boron carbide.

As stated, etching of the carbon body with the precursor material provides two beneficial results. First, the interconnected interstices act as a reservoir for the intermediate coating thereby increasing the volume of the intermediate coating material available for reaction with oxygen. Second, the precursor material reacts with carbon in the carbon body to form boron carbide which is contained in the porous surface. Boron carbide reacts with oxygen to form glass-like boron oxide. Thus, any oxygen that penetrates the intermediate coating is consumed by the boron carbide before it is able to attack the carbon body.

The carbon body to which the oxidation-resistant coatings are applied may be any one of a number of suitable structural forms of carbon, depending upon the intended use, and may include monolithic graphite, a composite of carbon fibers dispersed in a carbon matrix which in turn may be fully or partially graphitized, or any other suitable carbon. The carbon body may, for example, be a turbine part, a pump impeller, a spacecraft wing edge, or a component of rocket nozzles and engines. The particular type of structure of the carbon body does not form a part of the present invention.

In order to provide the porous etched layer containing boron carbide, the carbonaceous substrate is provided with a substantially uniform coating of a liquid or solid precursor material on the substrate surface. The precursor material is substantially non-reactive with the substrate at a relatively low temperature, such as room temperature, and is capable of reacting with the substrate at a second temperature which is substantially higher than the first temperature. The addition of the necessary precursor material may be accomplished in either one step or two steps. In using the one step addition, the precursor material comprises boron oxide, or a material containing boron-oxygen functional groups. In using the two step addition, the precursor material is formed by depositing boron or a boron containing hydrolyzable compound on the substrate surface, followed by hydrolysis of the hydrolyzable compound.

In any case, the substrate, after being coated with the precursor material, is raised to the second temperature. This causes a reaction of the coating with the substrate to form a porous region of substantially uniform depth in the substrate surface. The porous region contains interconnecting interstices and boron carbide and is typically 2 to 250 microns in depth. The etched layer of the carbon body generally has a void volume approaching 50 percent of the volume originally occupied by the carbon body.

The etched carbon body is then provided with a glass forming intermediate coating, the purpose of which is to react with any oxygen that may enter a crack or rupture and to form a glass-like sealant preventing the oxygen from reaching the carbon surface. In some instances such as when abrasion or erosion resistance are not required, the intermediate coating may be the only protective coating applied to the carbon body. However, for most environments and best oxidation resistance, further outer coatings are applied over the intermediate coating.

Preferably, the intermediate coating partially fills the interstices left as a result of the boron oxide etch. Thus, the void volume produced by the etching step is partially eliminated and the resulting product is essentially the same in its characteristic as the original carbon body.

Silicon may be deposited on the surface of the etched carbon body at a temperature higher than the melting point of silicon, or the silicon may be deposited at a temperature below its melting point and the coated part may subsequently be raised to above the melting point. In either case the silicon, at temperatures above its melting point, "wicks" into and fills the interstices of the etched surface, creating a fully dense surface.

The silicon may react in part with the boron carbide coating that results from the boron oxide etch according to the formula $2Si + B_4C \rightarrow SiB_4 + SiC$. Where chemical vapor deposition is used to deposit silicon, x-ray diffraction data indicates that simple $SiB_4$ is not actually formed but a similar and more complex compound results, namely $B_4(Si, B, C)H$. This probably results from the fact that during chemical vapor deposition of silicon, a hydrogen containing carrier gas is used.

When a silicon alloy intermediate coating is desired, the silicon may be alloyed with one or more other useful elements such as chromium, aluminum, titanium, zirconium, hafnium, vanadium, niobium, tantalum, tungsten, and molybdenum. These elements may be provided in the interstices along with the silicon by suitable deposition techniques as described above, or may be subsequently introduced via a displacement reaction. The free or combined silicon can be displaced in part by any of the above-named species in accordance with reactions similar to the one for titanium as follows:

$$TiCl_{4(g)} + 3Si_{(s)} \longrightarrow TiSi_{2(s)} + SiCl_{4(g)}$$

or

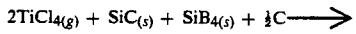
$$2TiCl_{4(g)} + SiC_{(s)} + SiB_{4(s)} + \tfrac{1}{4}C \longrightarrow$$
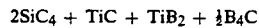
$$2SiC_4 + TiC + TiB_2 + \tfrac{1}{4}B_4C$$

When a carbon body is subjected to thermal cycling such that it is exposed to high temperatures above the melting point of silicon as well as low temperatures in the neighborhood of the melting point of boron oxide, it may be desirable to utilize both a silicon coating and a boron coating.

The boron coating is applied by chemical vapor deposition with the carbon body heated to a temperature above about 500° C., preferably between about 800° C. and about 1600° C. The pressure is maintained between about 0.1 Torr and about 760 Torr, preferably between about 1 Torr and about 200 Torr. A gaseous mixture of decomposable boron gas, e.g., boron trihalide, preferably boron trichloride, hydrochloric acid, hydrogen, and argon of the following composition may be flowed over the etched carbon body:

| Gas | Flow Rate, SCCM | % of Total Gas |
|---|---|---|
| $BCl_3$ | 440–1500 | 2.4–14.5 |
| $H_2$ | 220–6000 | 6.6–15.8 |
| HCl | 0–7400 | 0–19.5 |
| Ar | 2000–32000 | 60.7–76.2 |

The gas temperature is maintained between about ambient and 1600° C. and the contact time may be varied between about 30 seconds and about 4 hours. A total gas flow rate of between about 100 and about 100,000 SCCM, preferably between about 2600 and about 47,000 SCCM for a reactor having an internal diameter of less than one foot may be used. This results in a boron intermediate coating having a thickness of between about 0.1 micron and 500 microns.

The outer refractory coating may comprise carbides, borides or nitrides of: silicon, zirconium, tantalum, hafnium, niobium, or titanium. Aluminum boride or nitride or mixtures thereof are also suitable for the refractory coating, as is silicon oxynitride.

It is generally desirable to provide an outer coating of silicon carbide on top of the intermediate coating. The provision of such overcoating is described in the prior art including the aforementioned U.S. Pat. No. 4,515,860 and may be produced by CVD.

The following examples, which are given to more specifically illustrate some of the ways the method of the invention may be practiced, are not intended to limit the scope of the appended claims. They exemplify various embodiments of the present invention. In several of the proposed applications of coated carbonaceous materials, these coated components will be exposed to environmental moisture and/or water.

The overall etching process can be done by either a two or a three step process as described below. Either of these process can be repeated, if desired, to increase the depth of etching.

THE TWO-STEP PROCESS

The following three examples describe embodiments of the invention which contain two basic process steps:
1) contact between the boron-containing and carbonaceous materials; followed by,
2) high temperature reaction of the combined material.

In this process, materials containing boron-oxygen bonds can be added to the carbonaceous material at, or near, ambient conditions. These materials are believed to react with the carbonaceous material during the high temperature reaction step as described below:

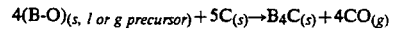
$$4(B-O)_{(s, \, l \, or \, g \, precursor)} + 5C_{(s)} \rightarrow B_4C_{(s)} + 4CO_{(g)}$$

Boron oxide has been found to be an effective form of boron oxygen bonds for the formation of boron carbide and porosity during the high temperature reaction as follows:

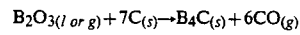
$$B_2O_{3(l \, or \, g)} + 7C_{(s)} \rightarrow B_4C_{(s)} + 6CO_{(g)}$$

EXAMPLE 1

A two-dimensional weave carbon-carbon composite coupon of a size approximately ½"×¾"×⅛" was used as the carbonaceous material. To one surface, a finely divided powder of boron oxide ($B_2O_3$) was spread. The coupon was then pyrolyzed in argon at 1700° C. for 15 minutes. The resulting carbonaceous material had a surface containing high porosity and a light grey appearance and resulted in the formation of boron carbide within the surface of the carbonaceous article.

EXAMPLE 2

This example illustrates alternative means of contacting boron containing solids with the carbonaceous material prior to the high temperature pyrolysts. Finely divided boric acid power ($H_3BO_3$) was used to prepare a paste to facilitate the dispersion of the boron onto the carbonaceous material. Separate pastes were prepared by blending the boric acid powder with petroleum jelly and vacuum grease. The pastes were subsequently spread evenly over the substrates followed by high temperature reaction as described in Example 1.

EXAMPLE 3

In this example, a saturated aqueous solution of boric acid was prepared at room temperature. A sample of carbonaceous substrate described in Example 1 was immersed in this concentrated solution for several minutes. These coupons were subsequently pyrolyzed in argon at 1200° C. Reaction of the boron-containing material with the carbonaceous materials was apparent; however, the extent of reaction was not as great as that observed in Example 1.

THE THREE-STEP PROCESS

The following six examples are provided to illustrate the alternative three-step embodiments of this invention:
1) contact between the boron-containing material and the carbonaceous material; followed by
2) hydrolysis of the boron-containing material within the surface of the carbonaceous material to form materials containing boron-oxygen functionalities; followed by,
3) high temperature reaction of the hydrolyzed solid.

A key to achieving a uniform and relatively deep surface reaction to $B_4C$ in the carbonaceous body is to get the hydrolyzed boron or hydrolyzable boron-containing chemical within the surface zone; for example, using a liquid source of this material which has an affinity to wet the carbonaceous material results in surface penetration through capillary forces. In this embodiment of the invention, a hydrolysis step converts the material to boron oxide or a material containing boron-oxygen functional groups, which subsequently reacts with the carbonaceous body at high temperature as described above.

EXAMPLE 4

The carbonaceous substrate used in this example was an uninhibited, two-dimensional weave carbon/carbon composite manufactured by Science Applications International Corporation. The cured ply thickness was approximately 6.6 mils. Boron was added to the carbonaceous material by contacting the carbonaceous material with an organic source of boron. In this example, trimethoxyboron [$B(OCH_3)_3$] liquid was used as the source of boron. After a 30 minute soak in trimethoxyboron at room temperature, the carbonaceous material was subsequently treated with a 50/50 (vol) solution of isopropanol and distilled, deionized water; The purpose of this treatment was to hydrolyze the boron within the surface zone of the carbonaceous material. After the hydrolysis treatment, the carbonaceous samples were air dried. Subsequently, these samples were pyrolyzed at 1700° C. in argon for a time and temperature of approximately 30 minutes. The resulting carbonaceous samples were uniformly etched to a depth of 32 microns, and were light grey in appearance.

X-ray diffraction analysis of the pyrolized material indicated the formation of boron carbide ($B_4C$) within the porous and chemically converted surface zone.

EXAMPLE 5

The processes and materials used were the same as that in Example 4, except for the hydrolysis step. After contacting the carbon composite and the trimethoxyboron, the treated material was hydrolyzed in air under average laboratory environmental conditions for a period of 24 hours. After the subsequent high temperature reaction at 1700° C., the treated composite had an etch depth of 8 microns uniformly into the surface. Additionally, x-ray diffraction of the material indicated the formation of boron carbide ($B_4C$) within the porous and reacted surface layer. Appearance was similar to Example 4.

EXAMPLE 6

The materials and methods of this example are also the same as that of Example 4, except for the hydrolysis treatment. In this example, hydrolysis was accomplished by reacting the boron treated samples with water vapor. The water vapor was produced by saturating a nitrogen stream at laboratory ambient conditions of temperature and pressure. After the subsequent pyrolysis step, the treated coupons had a grey appearing uniform etched layer about 14 microns thick. Additionally, x-ray diffraction analysis indicated the formation of boron carbide.

EXAMPLE 7

The materials and methods of this example are also the same as that described as Example 4, except for the hydrolysis step. In this case, the hydrolysis step was conducted by treating the boron contacted coupons with a 70/30 (vol) mixture of tetrahydrofuran (THF)/water. After the subsequent pyrolysis step, the treated coupons had a grey appearing uniformly etched layer about 32 microns thick (see Exhibit II). Additionally, x-ray diffraction analysis of the treated coupons indicated the formation of boron carbide ($B_4C$).

EXAMPLE 8

In this example, the process steps used were as described in Example 4 except for the hydrolysis step. An additional difference was that the carbon/carbon composite used was inhibited with ceramic particulates. Hydrolysis was accomplished by dropping water on the treated carbonaceous article and letting it soak and dry for 16 hours. After the final pyrolysis step, the surface of the inhibited carbon/carbon composite was porous and of a light grey appearance similar to the products of Examples 4-7. In addition, the depth of the reacted surface zone was 28 µm.

EXAMPLE 9

An alternative procedure is to infiltrate the carbonaceous material with a gaseous boron compound, such as $B(CH_3)_3$ or $BCl_3$. This step may be followed by hydrolysis with water vapor to form boron oxide and subsequent high temperature reaction to give the porous $B_4C$ layer.

Generally, the three-step method described in Examples 4-9 was found to yield a greater uniformity of surface etching/conversion than the two-step method described in Examples 1-3.

PROPOSED EQUIVALENTS FOR RAW MATERIALS USED

For the two-step process, any material containing boron-oxygen bonds is proposed. For the two- or three-step process described in Examples 1-9, any hydrolyzable boron-containing material such as any solid material containing boron-oxygen bonds is suitable e.g. isobutylboric acid, $(CH_3)_2CHCH_2B(OH)_2$. Additionally, liquid forms are also suitable, such as sub-boric acid, tetramethyl ester $(CH_3O)_2BB(OCH_3)_2$.

The carbonaceous article can be a graphite, a carbon fiber/carbon matrix composite, a carbon fiber/non-carbon matrix composite, or a non-carbon fiber/carbon matrix composite material.

A carbonaceous body could be manufactured to contain a material containing a hydrolyzed or hydrolyzable boron-containing material in the surface zone. For example, a carbon-carbon composite could be manufactured to contain finely divided $B_2O_3$ powder within the first 2-20 mils of the surface. In this case, only the high temperature reaction step would be required to effect the formation of porosity and boron carbide.

For the two- or three-step process, uniform application of the boron-containing material is important to insure uniform reaction. Dipping, brushing, infiltration, and spraying are four possible methods.

A high degree of hydrolysis is generally desirable in the three step process. Conditions which enhance the penetration of water into the carbonaceous substrate are desirable. For example, an experiment was conducted as described in Example 4, except for the conditions of the hydrolysis step. In this case, an aqueous solution of isopropanol/water (90/10) was used. This solution had a higher concentration of alcohol than the solution used in Example 4. After the three-step treatment, the reacted layer depth was shallower (26 μm and had a lower degree of conversion to $B_4C$ (via XRD analysis) than the product of Example 4.

The high temperature reaction is preferably carried out in an inert atmosphere at subambient pressures. Pressures greater than or equal to ambient pressure are also suitable. Temperatures of at least about 1200° C. up to about 3000° C. appear to be a practical high temperature range for the desired reaction. Preferably the high temperature range is about 1500° C. to about 2000° C. Temperatures in the range of 1650° C.-1750° C. will probably require reaction times of minutes.

The carbonaceous body can be uniformly surface covered by a boron-containing material at or near room temperature by many means including dipping, painting or spraying. This method thus easily permits the treatment of complex geometry parts. Since the carbonaceous part has been uniformly covered with the boron containing chemicals, only one high temperature reaction is required to cause reaction over the entire part. If the intrinsic material properties of the carbonaceous material stay the same, process scale-up to larger parts simply requires only larger vessels for the high temperature reaction (and possibly the hydrolysis reaction). Other changes in the small-scale process conditions are not required.

It may be seen, therefore that the invention provides an improved process for producing an oxidation resistant carbonaceous substrate. In addition, the invention includes the resultant article itself. The invention provides substantial uniformity of coating and substantially reduces non-uniformities in the resultant protective layer. Scale-up problems associated with high temperature, low pressure, and gas-solid reactions are avoided.

Various modifications of the invention in addition to those shown and described herein will become apparent to those skilled in the art from the foregoing description and accompanying claims. Such modifications are intended to fall within the scope of the appended claims.

What is claimed is:

1. A method for producing a protective coating on the surface of a carbonaceous substrate, comprising, providing a substantially uniform coating of liquid or solid precursor material on the substrate surface at a first temperature in the range of about 0° C. to about 100° C., said precursor material being one having boron-oxygen bonds and being substantially non-reactive with the substrate at the first temperature and being capable of reacting with the substrate at a second temperature in the range of about 1200° C. to about 3000° C., raising the substrate to the second temperature to etch and to react the coating with the substrate to form a porous region of substantially uniform depth in the substrate surface containing interconnecting interstices and boron carbide, wherein said porous region has a void volume of up to about 50 per cent of the volume originally occupied by the carbonaceous substrate, and at least partially filling said interconnecting interstices with a glass forming material.

2. A method according to claim 1 wherein said glass forming material is selected from the group consisting of boron, boron oxide, boron carbide, silicon, silicon alloy, silicon dioxide, silicon nitride, silicon oxynitride, germania, and mixtures thereof.

3. A method according to claim 1 wherein said precursor material comprises boron oxide or a material containing boron-oxygen functional groups.

4. A method according to claim 1 wherein said precursor material is formed by a depositing boron or a boron-containing hydrolyzable compound on the substrate surface, followed by hydrolyzing said hydrolyzable compound.

5. A method according to claim 1 wherein said precursor material comprises finely divided boron oxide powder.

6. A method according to claim 1 wherein said precursor material comprises finely divided boric acid powder blended with petroleum jelly and vacuum grease.

7. A method according to claim 1 wherein said precursor material comprises an aqueous solution of boric acid.

8. A method according to claim 1 wherein said precursor material comprises a hydrolyzable organic source of boron.

9. A method according to claim 8 wherein said precursor material comprises trimethoxy boron.

10. A method according to claim 8 wherein said precursor material comprises $(CH_3O)_2BB(OCH_3)_2$.

11. A method according to claim 8 wherein said precursor material comprises an infiltration layer formed by contacting said substrate with a gaseous boron compound.

12. A coated carbon body having improved resistance to high temperature oxidation comprising:
a carbon body,
said body having a converted porous layer formed by providing a substantially uniform coating of a liquid or solid precursor material on the substrate surface, said precursor material being one having boron-oxygen bonds and being substantially nonreactive with the substrate at a first temperature in the range of about 0° C. to about 100° C., and being capable of reacting with the substrate at a second temperature in the range of about 1200° C. to about 3000° C., and raising the substrate to the second temperature to etch and to react the coating with the substrate to form a porous region of substantially uniform depth in the substrate surface containing interconnecting interstices and boron carbide, wherein said converted porous layer has a void volume of up to about 50 per cent of the volume originally occupied by the carbonaceous substrate, and
a boron and silicon-containing glass forming coating at least a portion of which is within said converted layer, and
an outer refractory coating on said intermediate coating.

13. A coated body in accordance with claim 12 wherein the refractory coating is silicon nitride.

14. A coated carbon body having improved resistance to high temperature oxidation comprising:
a carbon body,
said body having a converted porous layer formed by providing a substantially uniform coating of a liquid or solid precursor material on the substrate surface, said precursor material being one having boron-oxygen bonds and being substantially nonreactive with the substrate at a first temperature in the range of about 0° C. to about 100° C., and being capable of reacting with the substrate at a second temperature in the range of about 1200° C. to about 3000° C., and raising the substrate to the second temperature to etch and to react the coating with the substrate to form a porous region of substantially uniform depth in the substrate surface containing interconnecting interstices and boron carbide, wherein said converted porous layer has a void volume of up to about 50 per cent of the volume originally occupied by the carbonaceous substrate, and
a glass forming coating at least a portion of which is within said converted layer.

15. A coated body in accordance with claim 14 wherein a refractory coating is deposited on the glass forming coating.

16. A coated body in accordance with claim 15 wherein the refractory coating comprises a material selected from the group consisting of carbides, borides or nitrides of silicon, zirconium, tantalum, hafnium, niobium and titanium, and silicon oxynitride, and aluminum boride or nitride or mixtures thereof.

17. A coated body in accordance with claim 14 wherein the converted layer has a depth of between about 3 and about 250 microns.

18. A coated body in accordance with claim 14 wherein the glass forming coating partially fills the interstices of said converted layer.

19. A coated carbon body having improved resistance to high temperature oxidation comprising:
a carbon body,
said body having a converted porous layer formed by providing a substantially uniform coating of a liquid or solid precursor material on the substrate surface, said precursor material being one having boron-oxygen bonds and being substantially nonreactive with the substrate at a first temperature in the range of about 0° C. to about 100° C., and being capable of reacting with the substrate at a second temperature in the range of about 1200° C. to about 3000° C., and raising the substrate to the second temperature to etch and to react the coating with the substrate to form a porous region of substantially uniform depth in the substrate surface containing interconnecting interstices and boron carbide, wherein said converted porous layer has a void volume of up to about 50 per cent of the volume originally occupied by the carbonaceous substrate, and
a glass forming coating at least a portion of which is within said converted layer, and
an outer refractory coating on said intermediate coating.

20. A coated body in accordance with claim 19 wherein the refractory coating is silicon nitride.

21. A coated body in accordance with claim 19 wherein the refractory coating is silicon oxynitride.

* * * * *